United States Patent [19]

Baum et al.

[11] Patent Number: 5,233,632
[45] Date of Patent: Aug. 3, 1993

[54] COMMUNICATION SYSTEM RECEIVER APPARATUS AND METHOD FOR FAST CARRIER ACQUISITION

[75] Inventors: Kevin L. Baum, Hoffman Estates; David E. Borth, Palatine; Phillip D. Rasky, Buffalo, all of Ill.

[73] Assignee: Motorola, Inc., Schaumburg, Ill.

[21] Appl. No.: 698,765

[22] Filed: May 10, 1991

[51] Int. Cl.⁵ .............................................. H04L 27/06
[52] U.S. Cl. ....................................... 375/97; 375/116
[58] Field of Search ............... 375/97, 116, 113, 11, 375/110, 111; 329/315, 319; 370/105.1, 105.5

[56] References Cited

U.S. PATENT DOCUMENTS

| | | | |
|---|---|---|---|
| 4,527,491 | 7/1985 | Deconche et al. | 375/97 |
| 5,012,491 | 4/1991 | Iwasaki | 375/97 X |

Primary Examiner—Curtis Kuntz
Assistant Examiner—Tesfaldet Bocure
Attorney, Agent, or Firm—James A. Coffing; Steven G. Parmelee; Joseph P. Krause

[57] ABSTRACT

A communications system receiver (100) is disclosed which receives a transmitted signal over a radio channel. The transmitted signal includes data and a predetermined synchronization sequence. The receiver (100) includes a demodulator (215), and a stored replica (207) of the predetermined synchronization sequence. The receiver (100) further includes apparatus (102) for computing (308) a reconstructed signal, by using the channel impulse response characteristic and the stored replica (207) of the synchronization sequence. A feature of the invention is to estimate (310) a phase offset value between an incoming signal and the reconstructed signal, for a plurality of synchronization symbols. This serves to establish (315) a relationship between the phase offset and a synchronization symbol index. The receiver then employs this relationship to derive (317) at least one "previous" phase state (214) for initializing (314) the demodulator (215).

15 Claims, 3 Drawing Sheets

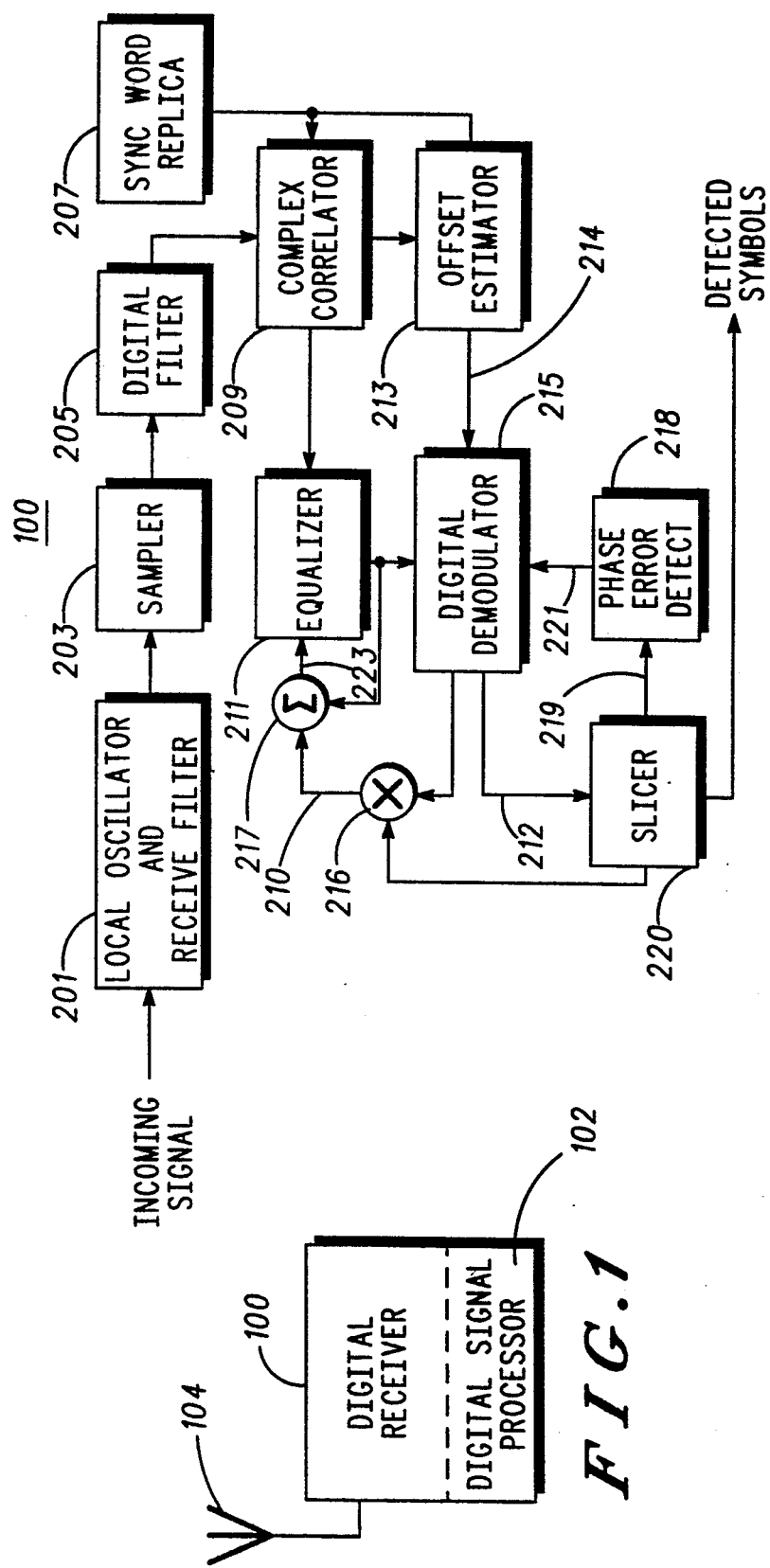

COMMUNICATION SYSTEM RECEIVER APPARATUS AND METHOD FOR FAST CARRIER ACQUISITION

FIELD OF THE INVENTION

The present invention relates generally to communications system receivers, and more particularly to fast acquisition of carrier signal parameters in such receivers.

BACKGROUND OF THE INVENTION

The problem of fast acquisition of carrier frequency and phase, sampling phase, and equalizer training for a digital communications system with quadrature modulation is well known in the art. Acquiring such parameters, particularly in an environment that is disturbed by intersymbol interference (ISI), presents an even greater challenge to the receiver design engineer. The use of analog carrier recovery loops are both expensive to manufacture, and often require field adjustments in order to keep operating properly. Furthermore, the use of pilot tones, or special frequency correction tones wastes signal energy and reduces system capacity. Lastly, the effects of ISI, and in particular, channel delay spread, often results in undetected errors in the incoming signal. Such errors require either a redundant process to remedy, or are left uncorrected which may result in unintelligible transmission.

Accordingly, there exists a dire need for a communication systems receiver which provides fast acquisition of carrier frequency and phase, and is not constrained by the aforementioned shortcomings.

SUMMARY OF THE INVENTION

The present invention encompasses a communications system receiver for receiving a transmitted signal over a channel having an impulse response characteristic. The transmitted signal includes data and a predetermined synchronization sequence. The receiver includes a demodulator, and a stored replica of the predetermined synchronization sequence for comparison to a received synchronization sequence. The receiver further includes apparatus for computing a reconstructed signal, by using the impulse response characteristic and the replica of the synchronization sequence. A feature of the invention is to estimate a phase offset value between an incoming signal and the reconstructed signal, for a plurality of synchronization symbols. This serves to establish a relationship between the phase offset and a synchronization symbol index. The receiver then employs this relationship to derive at least one "previous" phase state for initializing the demodulator.

DETAILED DESCRIPTION OF A PREFERRED EMBODIMENT

Figures 1, 2:
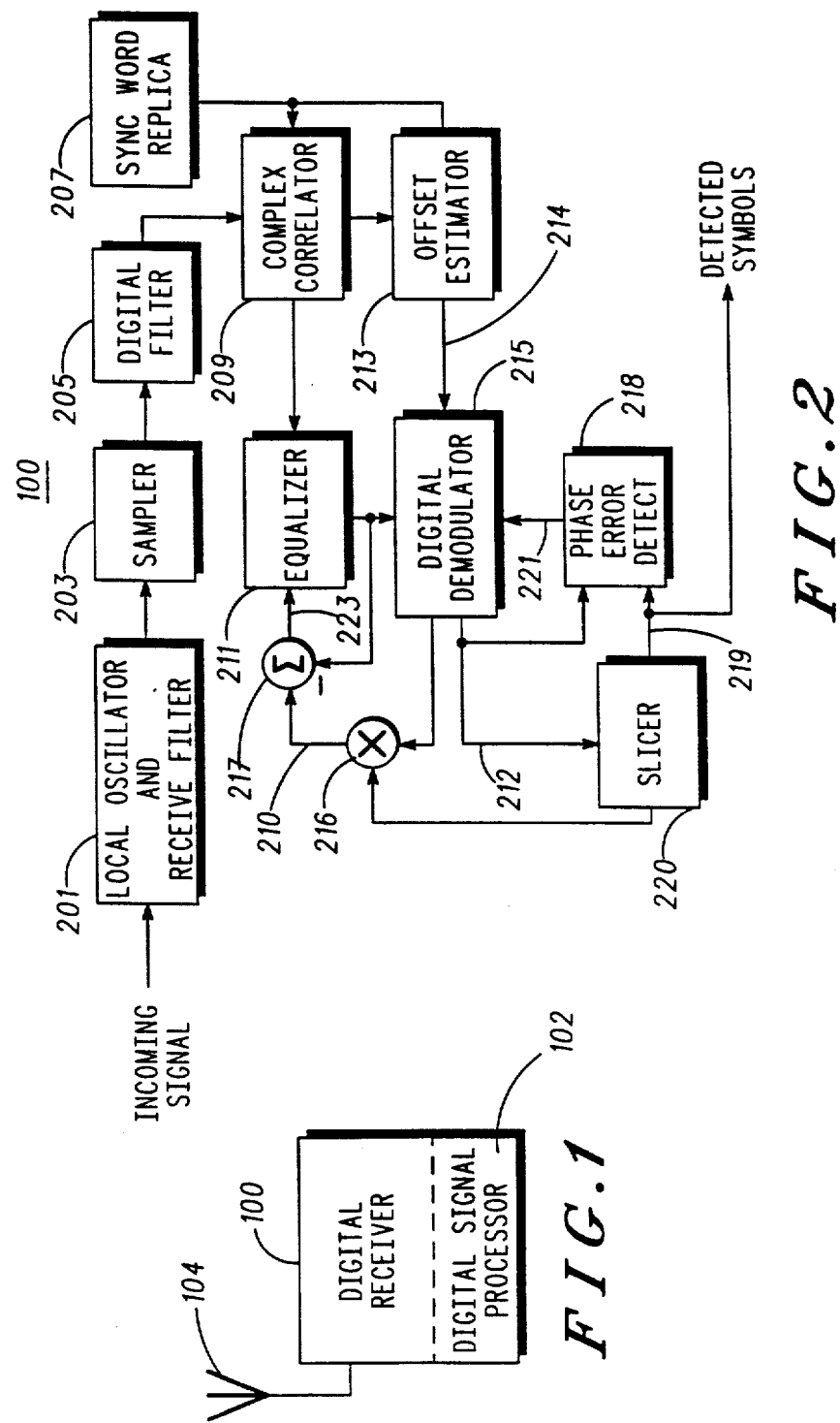
FIG. 1 is a simplified block diagram of a digital receiver which may employ the present invention.
FIG. 2 is a simplified block diagram showing some of the components which make up the digital receiver of FIG. 1, in accordance with the present invention.

FIG. 1 shows a simplified block diagram of a receiver configuration which may employ the present invention. Signals are received through antenna 104 and digitally processed using receiver 100 and digital signal processor (DSP) 102, which may be, for example, a Motorola DSP56001.

FIG. 2 shows a more detailed block diagram of the digital receiver 100. The incoming signal is mixed close to baseband by the local oscillator and receive filter 201. This function, typically implemented using analog circuitry, is well known in the art. The signal is then sampled and digitized using sampler 203, which may simply be an A/D convertor, at a rate which is some desired multiple of the symbol rate. A typical symbol rate for such a receiver is on the order of 24 kbaud (i.e., 24 k-bps in a 1-bit/symbol system, or 48 k-bps in a 2-bit/symbol system). The sampling rate may be as low as the symbol rate, but is typically higher (e.g., 8× symbol rate) to enhance the receivers ability to determine the symbol timing phase from the received signal. The digital filter 205 then filters the sampled signal and feeds the signal into a complex correlator 209. Additionally, a replica of a predetermined synchronization word, or sequence, stored in block 207, is fed into the complex correlator 209. The complex correlator 209 then correlates the received signal with the replica of the known synchronization sequence until a peak is detected. This indicates that a sync sequence has been received. Now the symbol sampling phase is determined and the channel impulse response $\{h(n)\}$ is calculated using the complex correlator 209. The frequency and phase offset between the replica and the received sync word are then estimated using the offset estimator 213. In the preferred embodiment, this is done using a least-squares curve fit, which process is later described, and the phase offsets are used to initialize a second-order digital demodulator 215. An alternate embodiment includes the use of the estimated frequency offsets to update a filter in an automatic frequency control (AFC) scheme. The second-order digital demodulator 215 is used because it can track phase and frequency offsets with zero error (reference article "Burst Coherent Detection With Robust Frequency and Timing Estimation For Portable Radio Communications", published by Bell Communications Research, Globecomm 1988, Section 2). An equalizer 211 can then be trained with the effects of frequency and phase offset removed. After training, the receiver tracks channel variations by updating the equalizer 211 and digital demodulator 215 in a decision-directed mode, which algorithm is later described.

Figure 3A:
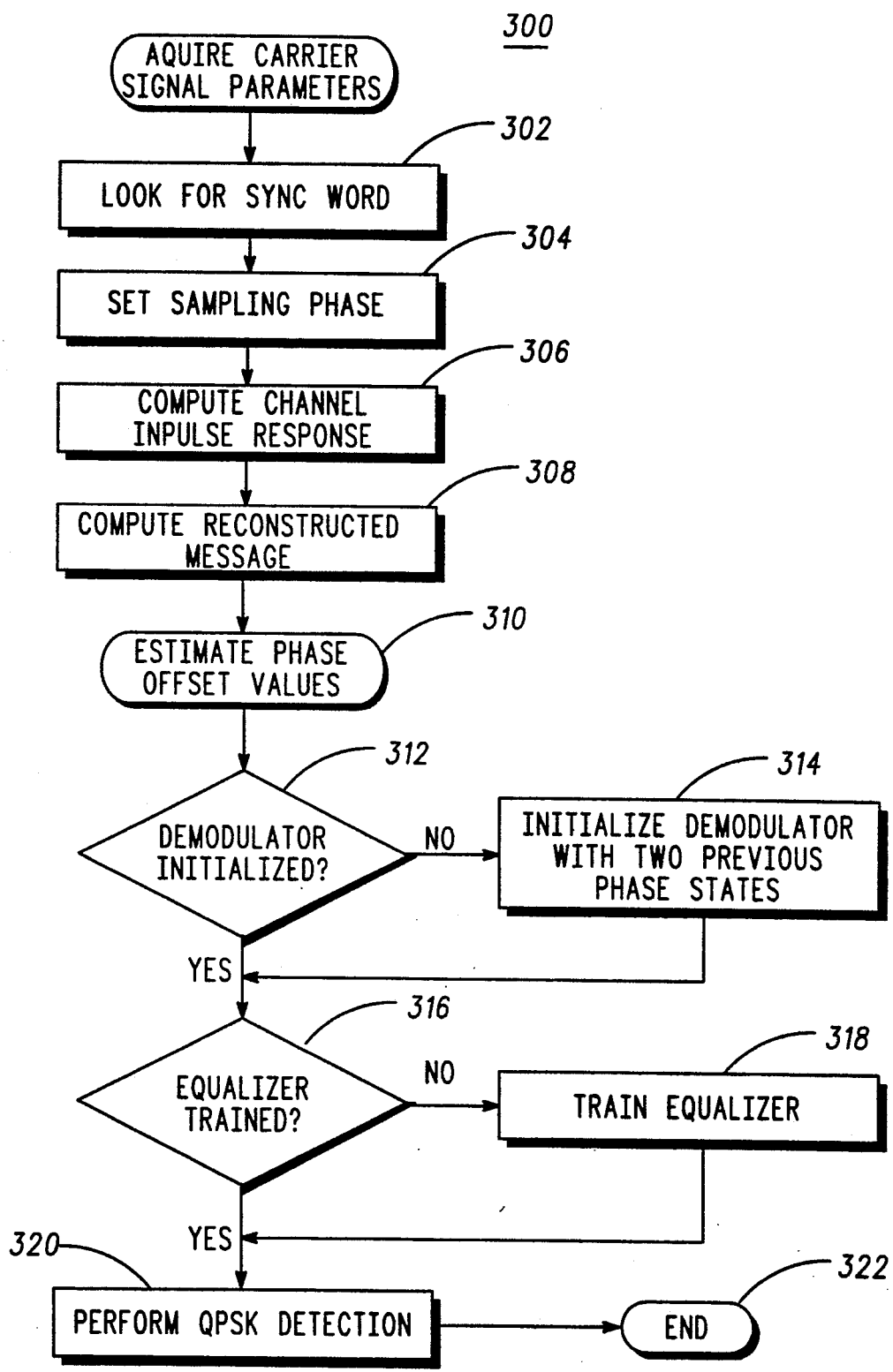
FIG. 3A is a simplified flow diagram depicting the operation of the digital receiver of FIG. 1, in accordance with the present invention.

FIG. 3A shows a simplified flow diagram of the algorithm performed by DSP 102 to acquire carrier signal parameters, in accordance with the present invention. Using the complex correlator 209, a sync word in the received signal is looked for at 302 until it is found. Once found, the initial symbol sampling phase is set at 304 at the correlation peak magnitude. The channel impulse response $\{h(n)\}$ is then computed at 306 using the sync word cross correlation. Steps 302, 304, 306 are fairly common in time division multiple access (TDMA) systems, so they will not be described in mathematical detail. The main requirement is that the synchronization word must be designed to allow channel sounding (i.e., allowing $\{h(n)\}$ to be obtained from the sync word cross correlations). The impulse response {h(n)}, having k discrete terms, will characterize the ISI introduced by the channel. In addition, the phase offset is contained in {h(n)} and can be identified as $\theta_0 = \angle\{h(0)\}$, (i.e., the angle of the resultant vector in the I-Q plane).

If there is no frequency offset the signal y(n) can be modeled by:

$$y(n) = \sum_{m=0}^{k-1} x(n-m)h(m) + z(n) \quad (1)$$

A Where:
x(n−m)=symbols from the transmitter
h(m)=channel impulse response
z(n)=additive noise If a frequency offset is present, the signal y(n) can be modeled by:

$$y(n) = \sum_{m=0}^{k-1} e^{j\omega_0(n-n_0)} x(n-m)h(m) + z_1(n) \quad (2)$$

Where:
$\omega_0$=frequency offset
$n_0$=integer constant
$z_1$=additive noise

Referring back to FIG. 3A, a reconstructed signal is then computed at 308. The reconstructed signal $y_r(n)$ is generated from:

$$y_r(n) = \sum_{m=0}^{k-1} x(n-m)h(m) \quad (3)$$

To assure that x(n−m) is known, $y_r(n)$ is calculated only over the known sync word symbols. The phase offset values $\theta_{diff}(n)$ between $y_r(n)$ and y(n) are then estimated at 310 over the known sync word symbols as follows:

$$\theta_{diff}(n) = \angle(y(n)) - \angle(y_r(n)) = \angle[y(n)y_r^*(n)] \quad (4)$$

$$= \tan^{-1}\left[\frac{Im[y(n)y_r^*(n)]}{Re[y(n)y_r^*(n)]}\right] \quad (5)$$

After simplification, equation 4 reduces to:

$$\theta_{diff}(n) = \angle[ce^{j\omega_0(n-n_0)} + z_2(n)] \quad (6)$$

where c is a real constant and $z_2(n)$ is additive noise. If the noise term is small equation 6 reduces to:

$$\theta_{diff}(n) = \omega_0 n - \omega_0 n_0 \quad (7)$$

Figure 3B:
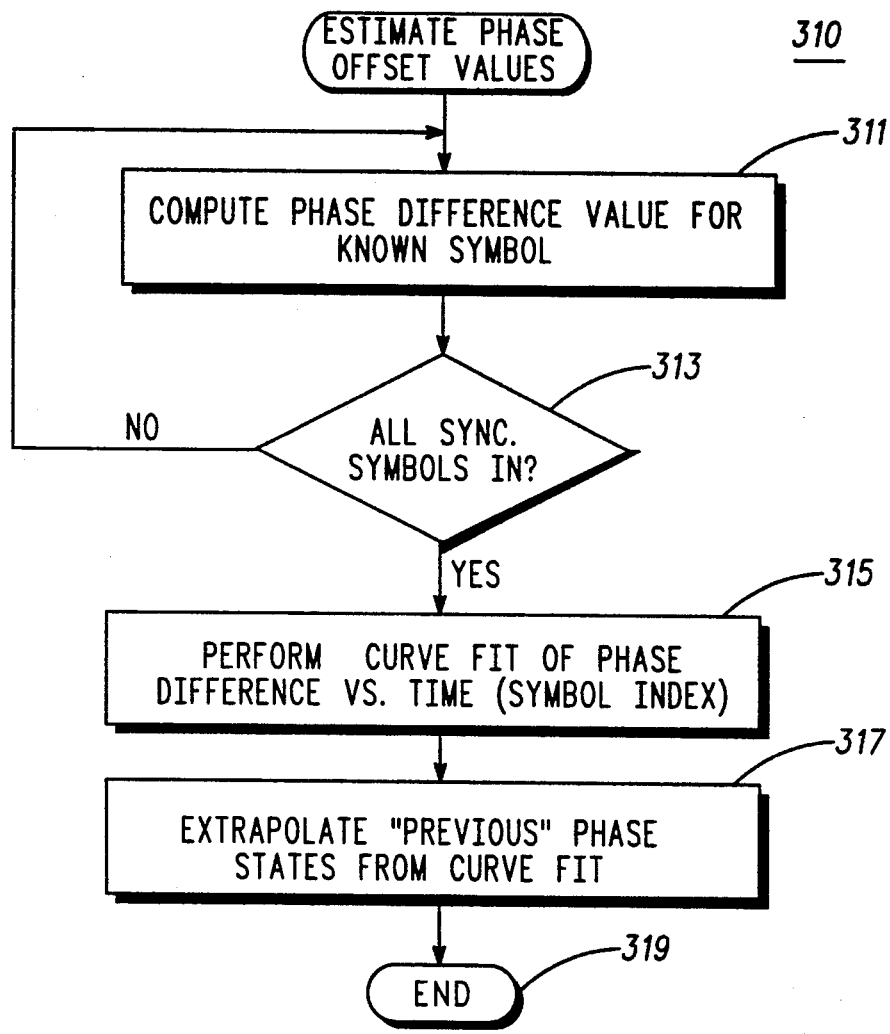
FIG. 3B is a simplified flow diagram detailing one operational component of the flow diagram of FIG. 3A, in accordance with one embodiment of the present invention.

Referring to FIG. 3B, the phase offset value estimation routine 310, which may be performed by DSP 102, is described in more detail. The phase difference values for known symbols are computed at 311. A decision is then reached at 313 where it is determined whether or not all symbols have been received. If not, the phase difference values are iteratively computed until all sync symbols are received. This process is done in accordance with equations 4–7. A least-squares curve fit is then performed at 315 over all the samples $\theta_{diff}(n)$ to estimate $\omega_0$ and $\omega_0 n_0$. Equation 7 shows that a frequency offset causes a linear trend in the phase difference $\theta_{diff}(n)$. Furthermore, noise will tend to be averaged out over all the samples, yielding a nearly-pure linear relationship between the phase difference value and time (which is denoted by a synchronization symbol index). Using this nomenclature, known symbols are assigned non-negative indices (i.e., 0,1,2,3, ... ), while "previous" symbols are assigned negative indices (i.e., −1,−2,−3, ... ). Through the data is fit with a linear curve-fit in the preferred embodiment, it should be understood that it could also be curve-fit to a polynomial of any order, depending on the accuracy required for the application.

The aforementioned process produces a best-fit phase difference line, which is then transformed to the initial phase states for the second order digital demodulator 215. This is done by first adding $\theta_0$ to the best-fit line, and then extrapolating at 317 to symbol index=(−1) and (−2). Performing this extrapolation allows us to "guess" what the the phase offset value for the two previous symbols would have been. The phase at these points is denoted by $\theta(-1)$ and $\theta(-2)$, respectively. The transfer function selected for the second-order digital demodulator 215 is given below:

$$H(z) = \frac{\theta(z)}{\theta_e(z)} = \frac{2(1-\alpha)z^{-1} + (\alpha^2+\beta^2-1)z^{-2}}{1-2z^{-1}+z^{-2}} \quad (8)$$

where $\alpha$ and $\beta$ are constants which affect the overall loop bandwidth. In the time domain, the operation of the digital demodulator 215 is described by:

$$\theta(n) = 2\theta(n-1) - \theta(n-2) + 2(1-\alpha)\theta_e(n-1) + (\alpha^2+\beta^2-1)\theta_e(n-2) \quad (9)$$

The phase estimation routine is then exited at 319. Referring back to FIG. 3A, a decision is then reached at 312 where it is determined whether or not the demodulator has been initialized with the two previous states. If not, the demodulator is initialized at 314 with the two "previous" values extrapolated from the best-fit line at 317. Sending this previous state information to the second-order digital demodulator 215 serves to completely specify the initial conditions for that device, effectively resulting in zero-acquisition time. A decision is then reached at 316 which determines whether or not the equalizer 211 has been trained. If not the equalizer is trained at 318 as follows:

Equation 9 shows that $\theta(n)$ depends on the 2 previous states and the 2 previous inputs. By using the initial states $\theta(-1)$ and $\theta(-2)$ derived in step 317 and setting $\theta_e$ to zero, the digital demodulator 215, in FIG. 2, will exactly remove the linear phase error trend over the sync word that was calculated in step 315. Consequently, the equalizer 211 will be trained with the effect of frequency offset removed from the training data. This is accomplished using a passband equalizer structure, which is later described.

The demodulator phase error signal 221 ($\theta_e(n)$ in the equations) is generated in phase error detect block 218 by subtracting the phase of the slicer output 219 from the phase of the slicer input 212. After the equalizer 211 is trained, $\theta_e(n)$ becomes reliable and does not need to be held at zero any longer. Now the receiver operates in a decision-directed mode and can track channel variations for the duration of the transmit burst. The equalizer 211 tracks changes in the channel impulse response while the digital demodulator 215 tracks frequency and phase variations. In the preferred embodiment, quadrature phase-shift keying (QPSK) detection is then performed at 320 on the remainder of the transmit burst, before the routine is exited at 322. It should be noted that alternate embodiments, adapted for other modulation schemes (e.g. BPSK, QAM, TFM, GTFM, GMSK), may readily employ the present invention.

Referring back to FIG. 2, one important feature of the passband equalizer structure is that the output of the equalizer 211 is demodulated (i.e. using demodulator 215) before a symbol decision is made in the slicer 220. After a decision is made, it is re-modulated (i.e., using mixer 216 to produce decision 210) so that the equalizer error signal 223, generated in adder 217 by subtracting the equalizer output from remodulated decision 210, is isolated from the operation of the demodulator 215. This isolation is present as long as the demodulator 215 is operating properly. The least-squares fast start-up algorithm allows the demodulator 215 to acquire and be operating properly before the equalizer 211 is trained.

It should be noted that one of ordinary skill in the art would anticipate several alternate embodiments of the present invention. As an example, the receiver 100 can be implemented without an equalizer, if desired. Accordingly, $\{h(n)\}$ consists only of $h(0)$, equalizer training is not required, and the demodulator phase error signal $\theta_e(n)$ does not need to be held at zero while the received sync word is being demodulated.

Additionally, in a high level QAM system, or a system operating over a channel that introduces severe ISI, the received and sampled signal $y(n)$ will not have a constant signal to noise ratio. As a result, each of the phase difference samples $\theta_{diff}(n)$ will have a different variance. The phase/frequency offset estimation algorithm 310 must be modified so that each phase difference sample is weighted according to its relative reliability. A way to accomplish this task is to use a modified linear least squares curve fit with weighted error samples. In the least squares framework, we have samples $v(i)$ taken at times $t(i)$ and the goal is to find the parameters "a" and "b" of the line:

$$\hat{v}(i) = bt(i) + a \qquad (10)$$

such that the error function with sample weights $w(i)$, $$e_w = \sum_i w(i)(v(i) - \hat{v}(i))^2 \qquad (11)$$

is minimized. The solution to this weighted least squares problem is obtained by taking the partial derivatives of Equ. (11) with respect to "a" and "b" and setting these derivatives to zero. The resulting set of equations is:

$$\begin{bmatrix} \sum_i w(i)t(i) & \sum_i w(i)t^2(i) \\ \sum_i w(i) & \sum_i w(i)t(i) \end{bmatrix} \begin{bmatrix} a \\ b \end{bmatrix} = \begin{bmatrix} \sum_i w(i)t(i)v(i) \\ \sum_i w(i)v(i) \end{bmatrix} \qquad (12)$$

Equ. (12) reduces to the standard least squares equation if $w(i)$ is set to 1. The weight selection criteria may be, for example, to choose $w(i)$ such that the weighted phase error due to noise of each sample has equal variance. With this criteria a sample with higher signal to noise ratio is weighted more heavily than a sample with a lower signal to noise ratio. For moderate to high signal to noise ratios, the phase error variance is inversely proportional to the signal to noise ratio. The weight of the first sample $w(1)$ can be arbitrarily set to 1. Then the signal power of each sample is estimated from the reconstructed signal according to $S_i = y_r(i) y_r(i)^*$. Finally, the weight of the other samples is determined by their relative signal power. For example, if $S_i/S_1 = K_i$, then $w(i) = K_i$.

Another embodiment of the invention permits its use with a partial response continuous phase modulation (CPM) scheme. To accomplish this, it is necessary to substitute the complex baseband modulated version of the sync sequence for the term $x(n-m)$ in Equ. (3). This step removes the effect of the baseband partial response filtering operation in CPM from the estimate of the frequency offset. Hence, the invention could alternately be used with TFM, GTFM, GMSK, etc.

Still another embodiment may be to employ the present invention a control input to a standalone AFC subsystem. To accomplish this, the slope of the least-squares linear curve fit calculated in step 315, which represents an estimate of the frequency offset between the received signal and the receiver local oscillator (LO), is fed to an accumulator (e.g., first-order IIR filter), the output of which is scaled and fed to a VCO input of the receiver LO. With the addition of this signal path, this embodiment permits true AFC of the receiver LO using just the sync sequence present in the data stream.

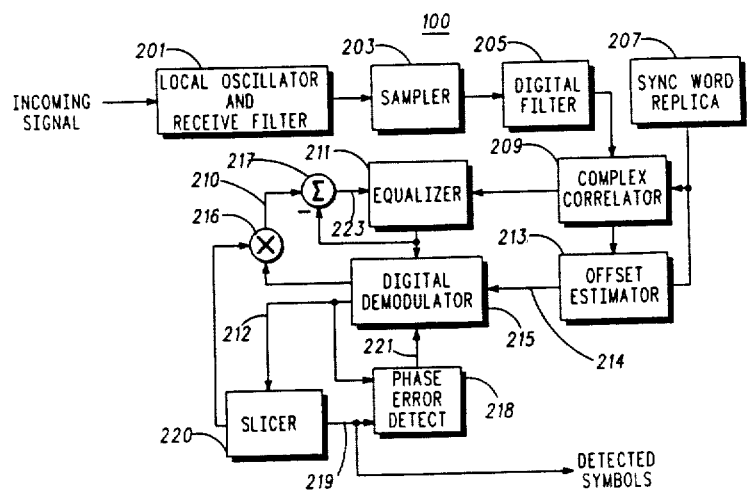

What is claimed is:

1. A communications system receiver for receiving a transmitted signal over a channel having an impulse response characteristic, the transmitted signal including data and a predetermined synchronization sequence having a plurality of synchronization symbols, the receiver storing a replica of the predetermined synchronization sequence for comparison to a received synchronization sequence, the communications system receiver comprising:

means for computing a reconstructed signal using the impulse response characteristic and the replica of the synchronization sequence;

means for computing a plurality of phase difference values between an incoming signal and said reconstructed signal for the plurality of synchronization symbols;

means for performing a curve-fit of said plurality of phase difference values versus a synchronization symbol index for the plurality of synchronization symbols, whereby a best-fit line is produced; and means for extrapolating from said best-fit line at least one phase state which corresponds to a previous synchronization symbol index.

2. A communications system receiver in accordance with claim 1, further comprising a demodulator which is initialized with said at least one phase state.

3. A communications system receiver for receiving a transmitted signal over a channel having an impulse response characteristic, the transmitted signal including data and a predetermined synchronization sequence having a plurality of synchronization symbols, the receiver having a demodulator and storing a replica of the predetermined synchronization sequence for comparison to a received synchronization sequence, the communications system receiver comprising:

means for computing a reconstructed signal using the impulse response characteristic and the replica of the synchronization sequence;

means, coupled to said means for computing, for estimating a phase offset value corresponding to at least one of a plurality of synchronization symbol indices; and means for initializing the demodulator with at least one of said estimated phase offset values.

4. A communications system receiver in accordance with claim 3, wherein said means for estimating further comprises:
   means for computing a plurality of phase difference values between an incoming signal and said reconstructed signal for the plurality of synchronization symbols;
   means for performing a curve-fit of said plurality of phase difference values versus said synchronization symbol indices, whereby a best-fit line is produced; and
   means for extrapolating from said best-fit line at least a first and a second phase state which each correspond to a previous synchronization symbol index.

5. A communications system receiver in accordance with claim 3, further comprising means, coupled to the demodulator, for removing inter-symbol interference (ISI) within said incoming signal.

6. A communications system receiver in accordance with claim 5, wherein said means for removing ISI further comprises an equalizer.

7. A communications system receiver for receiving a transmitted signal over a channel having an impulse response characteristic, the transmitted signal including data and a predetermined synchronization sequence having a plurality of synchronization symbols, the receiver having a demodulator and storing a replica of the predetermined synchronization sequence for comparison to a received synchronization sequence, the communications system receiver comprising:
   means for computing a reconstructed signal using the impulse response characteristic and the replica of the synchronization sequence;
   means for computing a plurality of phase difference values between an incoming signal and said reconstructed signal for the plurality of synchronization symbols;
   means for performing a curve-fit of said plurality of phase difference values versus a synchronization symbol index for the plurality of synchronization symbols, whereby a best-fit line is produced;
   means for extrapolating from said best-fit line at least a first and a second phase state which each correspond to a previous synchronization symbol index; and
   means for initializing the demodulator with at least said first and second phase state.

8. A communications system receiver in accordance with claim 7, further comprising an equalizer means for removing inter-symbol interference (ISI) within said incoming signal.

9. A method of acquiring carrier signal frequency and phase in a communications system receiver, the carrier signal transporting a signal over a channel having an impulse response characteristic, the signal including data and a predetermined synchronization sequence having a plurality of synchronization symbols, the receiver having a demodulator and storing a replica of the predetermined synchronization sequence for comparison to a received synchronization sequence, the method comprising the steps of:
   computing a reconstructed signal using the impulse response characteristic and the replica of the synchronization sequence;
   estimating a phase offset value for the plurality of synchronization symbols, such that a relationship is established between the phase offset value and a synchronization symbol index, wherein the step of estimating comprises the step of
   computing a plurality of phase difference values between an incoming signal and said reconstructed signal for the plurality of synchronization symbols; and
   initializing the demodulator with at least one phase offset value derived from said relationship.

10. A method of acquiring carrier signal frequency and phase in accordance with claim 9, wherein said step of estimating further comprises:
    performing a curve-fit of said plurality of phase difference values versus the synchronization symbol index for the plurality of synchronization symbols, whereby a best-fit line is produced; and
    extrapolating from said best-fit line at least a first and a second phase state which each correspond to a previous synchronization symbol index.

11. A method of acquiring carrier signal frequency and phase in accordance with claim 10, wherein said step of performing a curve fit further comprises performing a least-squares polynomial curve-fit.

12. A method of acquiring carrier signal frequency and phase in accordance with claim 10, wherein said step of performing a curve-fit further comprises performing a weighted least-squares curve-fit.

13. A method of acquiring carrier signal frequency and phase in accordance with claim 12, further comprising calculating a weighting coefficient for each of said phase difference values, said weighting coefficient being based on a signal-to-noise ratio variance among phase difference samples.

14. A method of acquiring carrier signal frequency and phase in a communications system receiver, the carrier signal transporting a signal over a channel having an impulse response characteristic, the signal including data and a predetermined synchronization sequence having a plurality of synchronization symbols, the receiver having a demodulator and storing a replica of the predetermined synchronization sequence for comparison to a received synchronization sequence, the method comprising the steps of:
    computing a reconstructed signal using the impulse response characteristic and the replica of the synchronization sequence;
    computing a plurality of phase difference values between an incoming signal and said reconstructed signal for the plurality of synchronization symbols;
    performing a polynomial curve-fit of said plurality of phase difference values versus a synchronization symbol index for the plurality of synchronization symbols, whereby a best-fit line is produced;
    extrapolating from said best-fit line at least a first and a second phase state which each correspond to a previous synchronization symbol; and
    initializing the demodulator with said first and second phase states.

15. A method of acquiring carrier signal frequency and phase in accordance with claim 14, wherein said step of performing a curve-fit further comprises performing a weighted least-squares curve-fit.

* * * * *

UNITED STATES PATENT AND TRADEMARK OFFICE
CERTIFICATE OF CORRECTION

PATENT NO. : 5,233,632         Page 1 of 4
DATED      : August 3, 1993
INVENTOR(S): Kevin L. Baum et al.

Figure 3A:
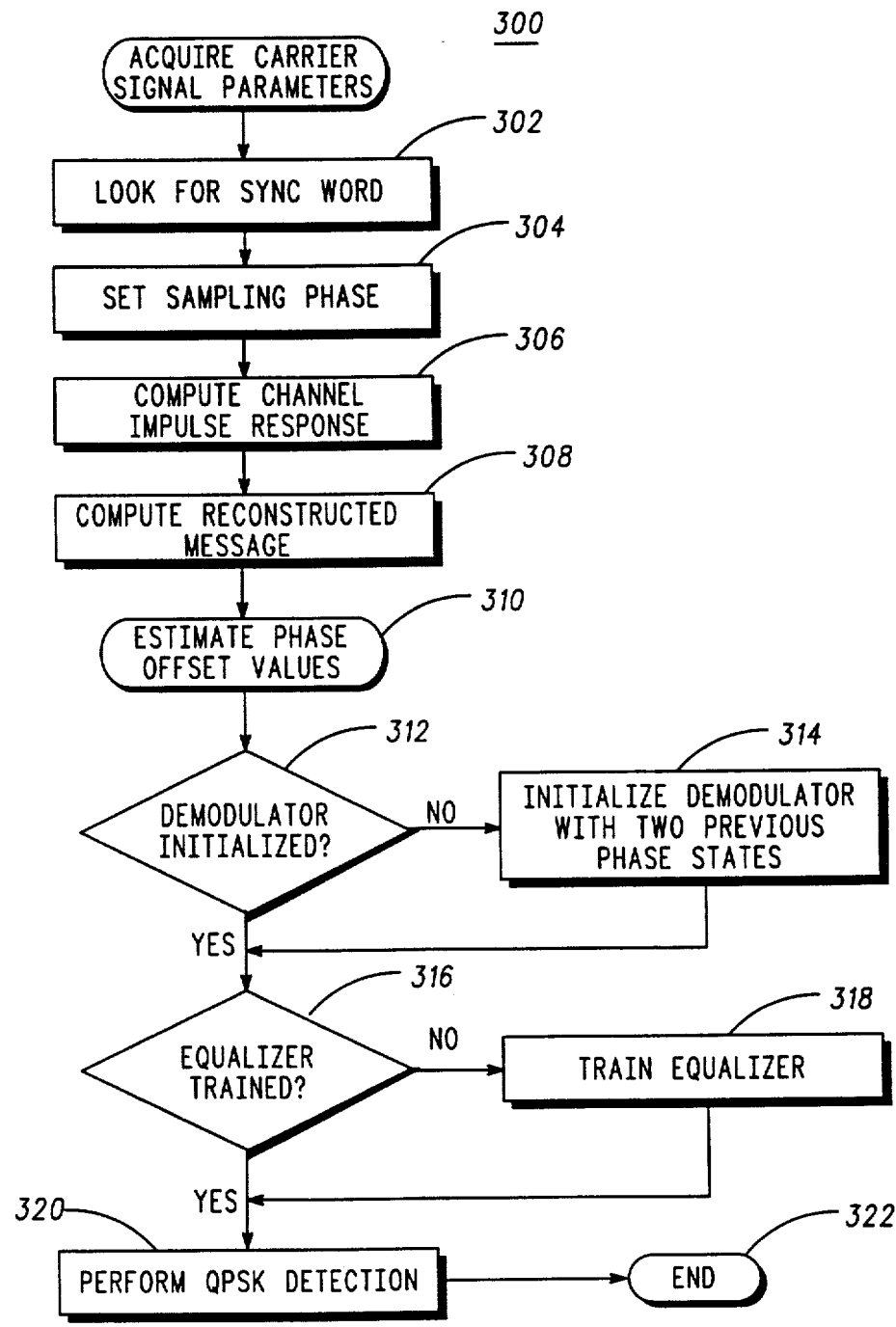

It is certified that error appears in the above-indentified patent and that said Letters Patent is hereby corrected as shown below: In the Drawings:

In FIG. 2, the Adder 217 input line should be denoted as a negative input line; Digital Demodulator 215 output line 212 should be inputted to Phase Error Detect 218; and Slicer 220 output line 219 should reflect that it is the same line as that denoted by the phrase "Detected Symbols", and in FIG. 3, typographical error should be corrected. Therefore, the title page, showing the illustrative figure, should be deleted and substitute therefor the attached title page, and Drawing Sheets 1 and 2, consisting of FIGS. 1, 2, and 3A, should be deleted and the attached Drawing Sheets 1 and 2, should be substituted therefor.

Signed and Sealed this

Nineteenth Day of April, 1994

Attest:

BRUCE LEHMAN

*Attesting Officer*          *Commissioner of Patents and Trademarks*

United States Patent [19]

Baum et al.

[11] Patent Number: 5,233,632
[45] Date of Patent: Aug. 3, 1993

[54] COMMUNICATION SYSTEM RECEIVER APPARATUS AND METHOD FOR FAST CARRIER ACQUISITION

[75] Inventors: Kevin L. Baum, Hoffman Estates; David E. Borth, Palatine; Phillip D. Rasky, Buffalo, all of Ill.

[73] Assignee: Motorola, Inc., Schaumburg, Ill.

[21] Appl. No.: 698,765

[22] Filed: May 10, 1991

[51] Int. Cl.⁵ .......................................... H04L 27/06
[52] U.S. Cl. ..................................... 375/97; 375/116
[58] Field of Search ................ 375/97, 116, 113, 11, 375/110, 111; 329/315, 319; 370/105.1, 105.5

[56] References Cited

U.S. PATENT DOCUMENTS 4,527,491 7/1985 Deconche et al. ............... 375/97
5,012,491 4/1991 Iwasaki ............................. 375/97 X Primary Examiner—Curtis Kuntz
Assistant Examiner—Tesfaldet Bocure
Attorney, Agent, or Firm—James A. Coffing; Steven G. Parmelee; Joseph P. Krause

[57] ABSTRACT

A communications system receiver (100) is disclosed which receives a transmitted signal over a radio channel. The transmitted signal includes data and a predetermined synchronization sequence. The receiver (100) includes a demodulator (215), and a stored replica (207) of the predetermined synchronization sequence. The receiver (100) further includes apparatus (102) for computing (308) a reconstructed signal, by using the channel impulse response characteristic and the stored replica (207) of the synchronization sequence. A feature of the invention is to estimate (310) a phase offset value between an incoming signal and the reconstructed signal, for a plurality of synchronization symbols. This serves to establish (315) a relationship between the phase offset and a synchronization symbol index. The receiver then employs this relationship to derive (317) at least one "previous" phase state (214) for initializing (314) the demodulator (215).

15 Claims, 3 Drawing Sheets